United States Patent
Ichigaya et al.

(10) Patent No.: US 12,273,514 B2
(45) Date of Patent: Apr. 8, 2025

(54) ENCODING DEVICE, DECODING DEVICE, ENCODING METHOD, AND DECODING METHOD

(71) Applicant: NIPPON HOSO KYOKAI, Tokyo (JP)

(72) Inventors: Atsuro Ichigaya, Tokyo (JP); Shunsuke Iwamura, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

(21) Appl. No.: 18/348,477

(22) Filed: Jul. 7, 2023

(65) Prior Publication Data

US 2023/0353736 A1 Nov. 2, 2023

Related U.S. Application Data

(63) Continuation of application No. 17/457,209, filed on Dec. 1, 2021, now Pat. No. 11,736,689, which is a
(Continued)

(30) Foreign Application Priority Data

Nov. 28, 2016 (JP) .................................. 2016-230524
Feb. 10, 2017 (JP) .................................. 2017-023345

(51) Int. Cl.
*H04N 19/117* (2014.01)
*H04N 1/41* (2006.01)
(Continued)

(52) U.S. Cl.
CPC ............. *H04N 19/117* (2014.11); *H04N 1/41* (2013.01); *H04N 19/124* (2014.11);
(Continued)

(58) Field of Classification Search
CPC ...... H04N 1/41; H04N 19/117; H04N 19/124; H04N 19/13; H04N 19/136; H04N 19/157;
(Continued)

(56) References Cited

U.S. PATENT DOCUMENTS 9,185,404 B2  11/2015  Van der Auwera et al.
11,538,205 B2  12/2022  Le Chevalier
(Continued)

FOREIGN PATENT DOCUMENTS

JP  2008-022404 A  1/2008
JP  2013-058935 A  3/2013
(Continued)

OTHER PUBLICATIONS

Okubo Sakae et al., "H.265/HEVC Textbook" Oct. 21, 2013, pp. 47, 92, 150-154 (English translation) (Year: 2013).*
(Continued)

*Primary Examiner* — Maria E Vazquez Colon
(74) *Attorney, Agent, or Firm* — Studebaker Brackett PLLC (57) ABSTRACT

An encoding device 1 includes: a transformation unit 13 configured to calculate an orthogonal transform coefficient by performing an orthogonal transformation process on a residual image indicating a difference between the input image and a predicted image of the input image; a quantization unit 14 configured to generate a quantization coefficient by quantizing the orthogonal transform coefficient on the basis of a quantization parameter; an entropy encoding unit 24 configured to generate encoded data by encoding the quantization coefficient; an image decoding unit 10 configured to restore an orthogonal transform coefficient from the quantization coefficient on the basis of the quantization parameter and generate a reconstructed image by adding the predicted image to a residual image restored by performing inverse orthogonal transformation on the orthogonal transform coefficient; and a deblocking filtering unit 18 configured to perform a filtering process on the reconstructed image, wherein the deblocking filtering unit 18 controls a
(Continued)

filtering strength depending on a luminance signal level of the reconstructed image and the quantization parameter.

3 Claims, 4 Drawing Sheets

Related U.S. Application Data continuation of application No. 16/424,148, filed on May 28, 2019, now Pat. No. 11,212,525, which is a continuation of application No. PCT/JP2017/042461, filed on Nov. 27, 2017.

(51) Int. Cl.
| | |
|---|---|
| *H04N 19/124* | (2014.01) |
| *H04N 19/13* | (2014.01) |
| *H04N 19/136* | (2014.01) |
| *H04N 19/157* | (2014.01) |
| *H04N 19/176* | (2014.01) |
| *H04N 19/186* | (2014.01) |
| *H04N 19/61* | (2014.01) |
| *H04N 19/82* | (2014.01) |
| *H04N 19/86* | (2014.01) |

(52) U.S. Cl.
CPC ........... *H04N 19/13* (2014.11); *H04N 19/136* (2014.11); *H04N 19/157* (2014.11); *H04N 19/176* (2014.11); *H04N 19/186* (2014.11); *H04N 19/61* (2014.11); *H04N 19/82* (2014.11); *H04N 19/86* (2014.11)

(58) Field of Classification Search
CPC .... H04N 19/176; H04N 19/186; H04N 19/61; H04N 19/82; H04N 19/86
See application file for complete search history.

(56) References Cited

U.S. PATENT DOCUMENTS

| | | | |
|---|---|---|---|
| 11,729,400 B2* | 8/2023 | Yin | H04N 19/649 |
| | | | 375/240.18 |
| 2008/0193032 A1 | 8/2008 | Segall | |
| 2009/0263032 A1 | 10/2009 | Tanaka et al. | |
| 2013/0022112 A1 | 1/2013 | Lim et al. | |
| 2014/0177709 A1* | 6/2014 | Hattori | H04N 19/593 |
| | | | 375/240.12 |
| 2016/0366422 A1 | 12/2016 | Yin et al. | |
| 2018/0309995 A1 | 10/2018 | He et al. | |
| 2020/0228803 A1 | 7/2020 | Sullivan | |

FOREIGN PATENT DOCUMENTS

| | | |
|---|---|---|
| JP | 2014-531879 A | 11/2014 |
| WO | 2015/130541 A1 | 9/2015 |
| WO | 2016/172361 A1 | 10/2016 |

OTHER PUBLICATIONS

Okubo Sakae et al., "H.265/HEVC Textbook" Oct. 21, 2013, pp. 47, 92, 150-154 (Year: 2013).*
Recommendation ITU-T H.265 "High Efficiency Video Coding" International Telecommunication Union, Apr. 2013, 317 pages.
Okubo Sakae et al., "H.265/HEVC Textbook" Oct. 21, 2013, pp. 47, 92, 150-154 with English translation, 17 pages.
Tourapis, A. et al., "Deblocking in HEVC Some observations from the HDRWCG CfE" 19-26, Jun. 16, 2015, 7 pages.
Extended European Search Report for Europe Application No. 17874029.6, dated Jul. 6, 2020, 12 pages.
Sze et al., "High Efficiency Video Coding (HEVC)", in "High Efficiency Video Coding (HEVC)", dated Aug. 23, 2014, Springer International Publishing, Cham, XP055614236, 384 pages.

* cited by examiner

ENCODING DEVICE, DECODING DEVICE, ENCODING METHOD, AND DECODING METHOD

RELATED APPLICATIONS

This application is a Continuation of U.S. patent application Ser. No. 17/457,209 filed on Dec. 1, 2021, which is a Continuation of U.S. patent application Ser. No. 16/424,148 filed on May 28, 2019, which is a Continuation of International Application No. PCT/JP2017/042461 filed Nov. 27, 2017, which claims the benefit of Japanese Patent Application No. 2016-230524 filed on Nov. 28, 2016 and Japanese Patent Application No. 2017-023345 filed on Feb. 10, 2017, the entire contents of which are incorporated herein by reference.

TECHNICAL FIELD

The present disclosure relates to an encoding device, a decoding device, an encoding method, and a decoding method, in which a deblocking filtering process is performed.

BACKGROUND ART

In a video encoding method represented by moving picture experts group (MPEG) which has been mainstream, for convenience in realizing real time processing, encoding (compression) is performed by using a technology of dividing a unit of a video which is called a frame (or a picture) or the like into small regions in a block form and performing transformation in a block unit, prediction, or the like. In such an encoding method, a quality difference in a block boundary caused by a difference between neighboring blocks in an encoding control becomes distortion and is perceived. In a recent encoding method such as H.264/AVC or H.265/HEVC, a process which is called deblocking filtering has been adopted in order to reduce the encoding distortion.

A block distortion occurs as a signal in a boundary between two neighboring blocks suddenly fluctuates in a region between the neighboring blocks in which the signal fluctuation is supposed to be smooth due to signal deterioration caused by quantization of an orthogonal transform coefficient. A deblocking filter for reducing the distortion is designed as a low-pass filter which generally attenuates fluctuation of a signal. Since a signal deterioration amount is changed depending on a roughness in quantization, a filtering strength is controlled by a quantization parameter specifying the roughness in quantization (for example, see Non Patent Literature 1).

SUMMARY

An encoding device according to an embodiment encodes an input image. The encoding device comprising: a transformation unit configured to calculate an orthogonal transform coefficient by performing an orthogonal transformation process on a residual image indicating a difference between the input image and a predicted image of the input image; a quantization unit configured to generate a quantization coefficient by quantizing the orthogonal transform coefficient on the basis of a quantization parameter; an entropy encoding unit configured to generate encoded data by encoding the quantization coefficient; an image decoding unit configured to restore an orthogonal transform coefficient from the quantization coefficient on the basis of the quantization parameter and generate a reconstructed image by adding the predicted image to a residual image restored by performing inverse orthogonal transformation on the orthogonal transform coefficient; and a deblocking filtering unit configured to perform a filtering process on the reconstructed image. The deblocking filtering unit controls a filtering strength depending on a luminance signal level of the reconstructed image and the quantization parameter.

A decoding device according to an embodiment decodes encoded data of an input image. The decoding device comprising: an entropy decoding unit configured to decode the encoded data and acquire a quantization coefficient obtained by quantizing an orthogonal transform coefficient; an image decoding unit configured to restore an orthogonal transform coefficient from the quantization coefficient on the basis of a quantization parameter and generate a reconstructed image by adding a predicted image to a residual image restored by performing inverse orthogonal transformation on the orthogonal transform coefficient; and a deblocking filtering unit configured to perform a filtering process on the reconstructed image. The deblocking filtering unit controls a filtering strength depending on a luminance signal level of the reconstructed image and the quantization parameter.

DESCRIPTION OF EMBODIMENTS

As a new characteristic of video media, standardization of a high dynamic range (HDR) signal with an expanded rendering range of black and white which cannot be rendered by a video signal according to the related art, has been conducted. In comparison to a standard dynamic range (SDR) signal according to the related art, in the HDR signal, a portion with a low light intensity to a portion with a high light intensity (that is, a dark portion to a bright portion) are recorded with a limited bit depth, and thus a more drastic signal suppressing process which is called γ correction in comparison to the related art is performed. Currently, an HDR method includes a hybrid-log gamma (HLG) method prescribed by ARIB STD-B67 and a perceptual quantize (PQ) method prescribed by SMPTE ST.2084, and these manners are globally standardized as Recommendation ITU-R BT.2100 in ITU-R. It should be noted that there also is a possibility that a method other than these may be prescribed in the future.

Figure 1:
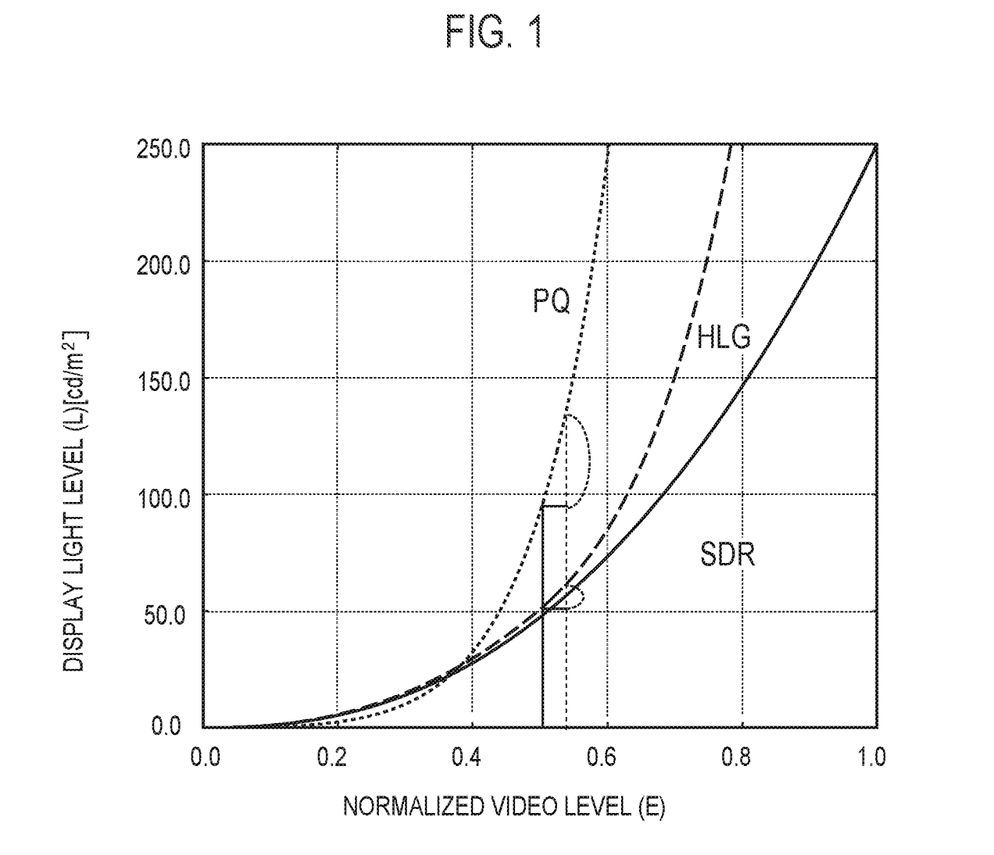
FIG. 1 is a view illustrating a corresponding relation between a signal level and a light level.

FIG. 1 illustrates a corresponding relation (inverse γ correction) between a luminance signal level of an image and a display light level at which the image is displayed on a display device, of each of an SDR signal, an HDR signal in the HLG method, and an HDR signal in the PQ method. It should be noted that the HLG method is a relative system in which a peak luminance of a display device has a maximum value, and thus a case in which the peak luminance is 1000 $cd/m^2$ is illustrated in the drawing. Similarly, the SDR signal according to the related art is also a relative system in which a peak luminance of a display device has a maximum value, and thus, a case in which a peak luminance of a currently commercially available display as an example is 250 cd/m² is illustrated.

In a case of the HDR signal, a change of the display light level (luminance) with respect to variation of the luminance signal level is larger than that of the SDR signal according to the related art. For this reason, in a region in which the signal level is high, block noise caused by a quantization distortion is exaggeratedly presented in comparison to signal deterioration according to the related art. In particular, in the PQ method with the highest degree of signal suppression, variation of the display light level depending on the luminance signal level is significant, and an influence of signal deterioration due to a block distortion is also significant. In order to reduce this phenomenon, a countermeasure of making a quantization parameter become small according to the signal level has been generally performed.

In the deblocking filtering according to the related art, a threshold value for switching a strength of the filtering for smoothing between blocks is determined in advance according to a quantization parameter in a frame unit, and a control according to the light signal level is not performed. For this reason, in the case of HDR signal, a non-linearity of a difference between luminance signal levels and a difference between display light levels is high, and it is difficult for the deblocking filtering according to the related art to sufficiently reduce a block distortion. In addition, even in the case of the SDR signal according to the related art, a non-linearity is caused by gamma correction, and thus an effect of the deblocking filtering is reduced in a region with a high light level, which is problematic.

Further, as the quantization parameter becomes excessively small, an average error amount of blocks can be decreased. However, as the quantization parameter becomes small, an action of the deblocking filtering is also reduced, such that it is not possible to sufficiently solve the problem that the difference between the luminance signal levels in a boundary portion is conspicuously presented. In addition, when the quantization parameter becomes small, an amount of information is increased, and thus a compression effect is also reduced.

In view of such circumstances, an object of the present disclosure is to provide an encoding device, a decoding device, an encoding method, and a decoding method, which can reduce a block distortion even in a case of a high-luminance portion of an SDR signal, and an HDR signal without deteriorating the compression effect.

An encoding device according to an embodiment is an encoding device which encodes an input image, and includes a transformation unit which calculates an orthogonal transform coefficient by performing an orthogonal transformation process on a residual image indicating a difference between an input image and a predicted image of the input image, a quantization unit which generates a quantization coefficient by quantizing the orthogonal transform coefficient on the basis of a quantization parameter, an entropy encoding unit which generates encoded data by encoding the quantization coefficient, an image decoding unit which restores an orthogonal transform coefficient from the quantization coefficient on the basis of the quantization parameter and generates a reconstructed image by adding the predicted image to a residual image restored by performing inverse orthogonal transformation on the orthogonal transform coefficient, and a deblocking filtering unit which performs a filtering process on the reconstructed image. The deblocking filtering unit controls a filtering strength depending on a luminance signal level of the reconstructed image and the quantization parameter.

A decoding device according to an embodiment is a decoding device which decodes encoded data of an input image, and includes an entropy decoding unit which decodes the encoded data and acquires a quantization coefficient obtained by quantizing an orthogonal transform coefficient, an image decoding unit which restores an orthogonal transform coefficient from the quantization coefficient on the basis of a quantization parameter, and generates a reconstructed image by adding a predicted image to a residual image restored by performing inverse orthogonal transformation on the orthogonal transform coefficient, and a deblocking filtering unit which performs a filtering process on the reconstructed image. The deblocking filtering unit controls a filtering strength depending on a luminance signal level of the reconstructed image and the quantization parameter.

According to the encoding device and the decoding device, the filtering strength can be changed depending on the luminance signal level, and it is possible to reduce a block distortion in the HDR signal in addition to the SDR signal, without deteriorating the compression effect.

Hereinafter, an embodiment will be described in detail with reference to the drawings.

Encoding Device

Figure 2:
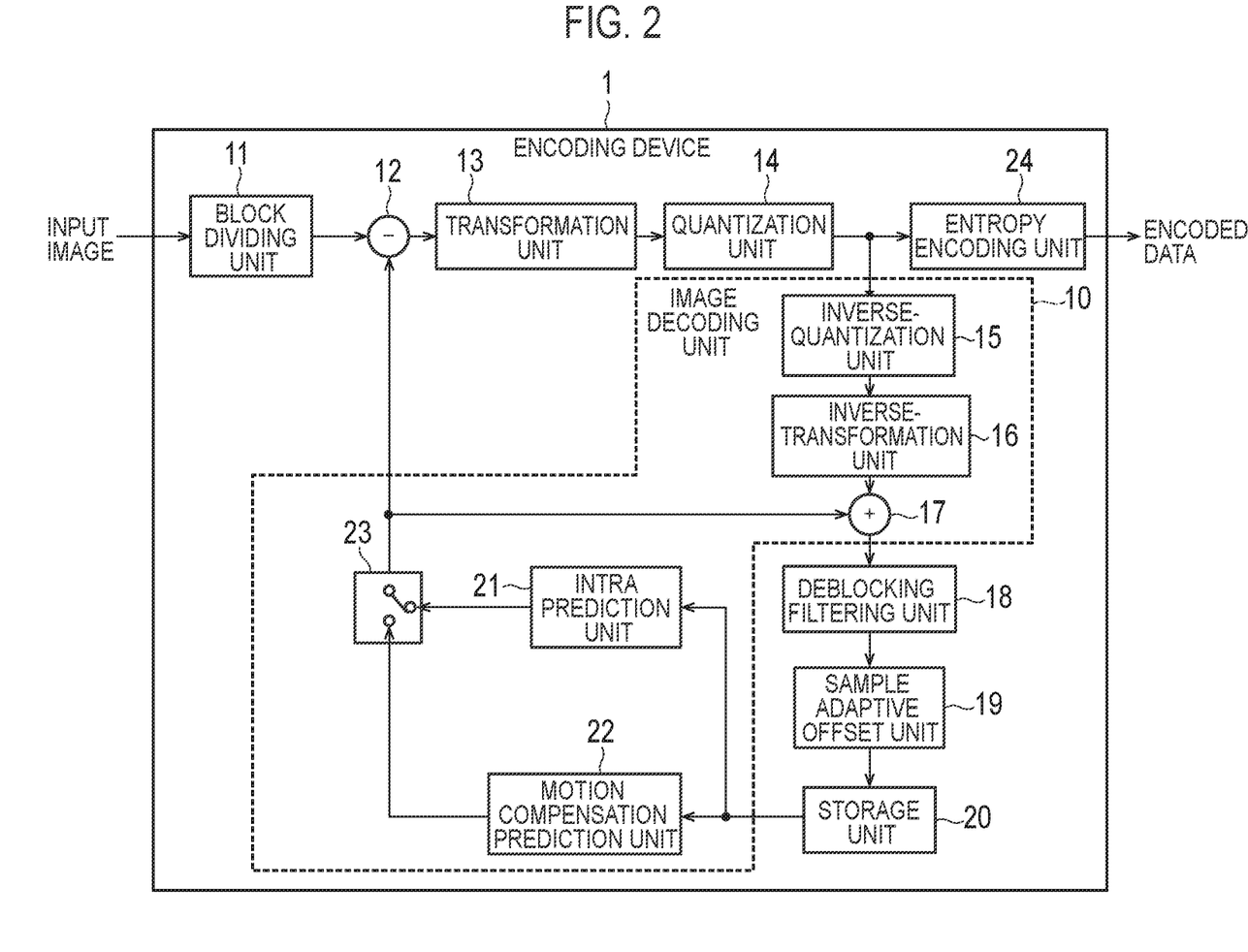
FIG. 2 is a block diagram illustrating an example of a configuration of an encoding device according to an embodiment of the present disclosure.

An encoding device according to an embodiment will be described below. FIG. 2 illustrates an example of a configuration of the encoding device according to the embodiment. An encoding device 1 illustrated in FIG. 2 includes a block dividing unit 11, a subtracting unit 12, a transformation unit 13, a quantization unit 14, an inverse-quantization unit 15, an inverse-transformation unit 16, an adding unit 17, a deblocking filtering unit 18, a sample adaptive offset unit 19, a storage unit 20, an intra prediction unit 21, a motion compensation prediction unit 22, a switching unit 23, and an entropy encoding unit 24. It should be noted that a processing unit which performs another post filtering process may be provided instead of or in addition to the sample adaptive offset unit 19.

The block dividing unit 11 divides a frame to be encoded, which is an input image, into a plurality of blocks, and outputs the block image to the subtracting unit 12. A size of the block may be variable, and may be, for example, 32×32 pixels, 16×16 pixels, 8×8 pixels, or 4×4 pixels.

The subtracting unit 12 subtracts each pixel value of a predicted image of the input image from each pixel value of the block image input from the block dividing unit 11, generates a residual image indicating a difference between the block image and the predicted image, and outputs the residual image to the transformation unit 13. The predicted image is input from the intra prediction unit 21 or the motion compensation prediction unit 22 to be described later through the switching unit 23.

The transformation unit 13 calculates an orthogonal transform coefficient by performing an orthogonal transformation process on the residual image input from the subtracting unit 12, and outputs the orthogonal transform coefficient for each block to the quantization unit 14.

The quantization unit 14 generates a quantization coefficient by quantizing the orthogonal transform coefficient for each block input from the transformation unit 13 on the basis of a quantization parameter (qP) specifying a roughness of quantization, and outputs the quantization coefficient to the inverse-quantization unit 15 and the entropy encoding unit 24. In more detail, the quantization unit 14 generates the quantization coefficient by dividing the orthogonal transform coefficient for each block input from the transformation unit 13 by a quantization step value derived from the quantization parameter. For example, a value of the quantization parameter is 0 to 51, and the quantization parameter and the quantization step value are associated with each other so that when the quantization parameter is increased by 6, the quantization step value is doubled (that is, the quantization parameter is proportional to a logarithm of the quantization step value).

The inverse-quantization unit 15 restores an orthogonal transform coefficient from the quantization coefficient input from the quantization unit 14 on the basis of the quantization parameter and outputs the restored orthogonal transform coefficient to the inverse-transformation unit 16. In more detail, the inverse-quantization unit 15 restores an orthogonal transform coefficient for each block by multiplying the quantization coefficient input from the quantization unit 14 by the quantization step value derived from the quantization parameter.

The inverse-transformation unit 16 generates a residual image by performing inverse orthogonal transformation on the orthogonal transform coefficient input from the inverse-quantization unit 15, and outputs the generated residual image to the adding unit 17. For example, in a case in which the transformation unit 13 performs discrete cosine transformation, the inverse-transformation unit 16 performs inverse-discrete cosine transformation.

The adding unit 17 generates a reconstructed image by adding each pixel value of the residual image input from the inverse-transformation unit 16 and each pixel value of the predicted image input from the switching unit 23, and outputs the reconstructed image to the deblocking filtering unit 18.

The deblocking filtering unit 18 performs a filtering process on the reconstructed image input from the adding unit 17, and outputs the reconstructed image after the filtering process to the sample adaptive offset unit 19. The deblocking filtering unit 18 controls a filtering strength depending on a luminance signal level (a pixel value of a luminance component) of the reconstructed image and the quantization parameter. This process will be described in detail later.

The sample adaptive offset unit 19 classifies the image input from the deblocking filtering unit 18 in a pixel unit, adds an offset according to the classification to each pixel value, and outputs a result as a decoded image to the storage unit 20. In addition, the sample adaptive offset unit 19 outputs information on a sample adaptive offset to the entropy encoding unit 24.

The intra prediction unit 21 generates an intra prediction image by performing intra prediction with reference to the decoded image stored in the storage unit 20, and outputs the intra prediction image to the switching unit 23. In addition, the intra prediction unit 21 outputs a selected intra prediction mode to the entropy encoding unit 24.

The motion compensation prediction unit 22 generates a motion vector by using a method such as block matching with reference to the decoded image stored in the storage unit 20, and outputs motion vector information to the entropy encoding unit 24. In addition, the motion compensation prediction unit 22 generates a motion compensation prediction image on the basis of the motion vector, and outputs the motion compensation prediction image to the switching unit 23.

The switching unit 23 switches between the intra prediction image input from the intra prediction unit 21 and the motion compensation prediction image input from the motion compensation prediction unit 22, and outputs a predicted image (the intra prediction image or the motion compensation prediction image) of the decoded image to the subtracting unit 12 and the adding unit 17.

The image decoding unit 10 is constituted by the inverse-quantization unit 15, the inverse-transformation unit 16, the adding unit 17, the intra prediction unit 21, the motion compensation prediction unit 22, and the switching unit 23. As described above, the image decoding unit 10 generates the reconstructed image by restoring the orthogonal transform coefficient from the quantization coefficient on the basis of the quantization parameter and adding the predicted image to the residual image restored by performing the inverse orthogonal transformation on the orthogonal transform coefficient.

The entropy encoding unit 24 performs entropy encoding on the quantization coefficient input from the quantization unit 14, the intra prediction mode input from the intra prediction unit 21, information on a predicted motion vector input from the motion compensation prediction unit 22, information on filtering input from the deblocking filtering unit 18, and information on the sample adaptive offset input from the sample adaptive offset unit 19, generates encoded data by performing data compression, and outputs the encoded data to the outside of the encoding device 1. In the entropy encoding, any entropy encoding method such as 0th order exponential Golomb coding, context-based adaptive binary arithmetic coding (CABAC), or the like can be used.

Deblocking Filtering Unit

Next, the deblocking filtering unit 18 will be described in detail. In the present embodiment, a size of a block on which the deblocking filtering unit 18 performs the process is, for example, 8×8 pixels. The deblocking filtering unit 18 first obtains a boundary strength Bs value indicating a strength of a smoothing process for each block. The Bs value is any one of 0, 1, and 2.

Figure 3:
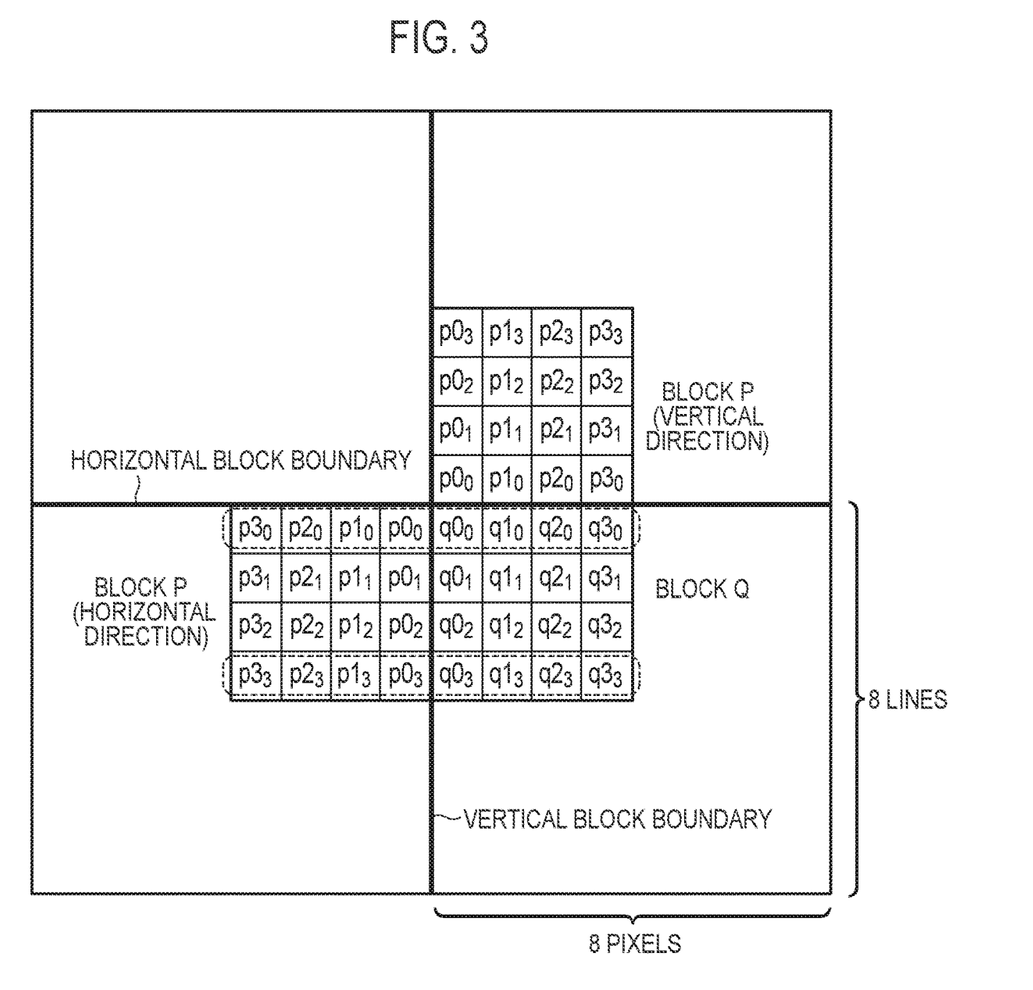
FIG. 3 is a view illustrating a block boundary on which a deblocking filtering process is performed.

FIG. 3 illustrates a block boundary on which the deblocking filtering process is performed. An example of the deblocking filtering process according to the H.265/HEVC method will be described with reference to FIG. 3. In a case where a block P or Q is a block on which intra prediction is performed, the Bs value is 2. In a case where the blocks P and Q are blocks on which the intra prediction is performed, and at least one of the following conditions is satisfied, the Bs value is 1, and in other cases, the Bs value is 0.

The block P or Q includes a significant (non-zero) orthogonal transform coefficient and is a boundary of a transform unit TU.

The numbers of motion vectors of the blocks P and Q or reference images are different.

An absolute value of a difference between the motion vectors of the blocks P and Q is four pixels or more.

The deblocking filtering unit 18 does not perform the filtering process in a case where the Bs value is 0. Hereinafter, a vertical block boundary illustrated in FIG. 3 will be described by way of example. When the Bs value is 1 or 2, the filtering process is performed only in a case where the following Expression (1) is satisfied.

[Math 1]

$$|p2_0-2p1_0+p0_0|+|p2_3-2p1_3+p0_3|+|q2_0-2q1_0+q0_0|+|q2_3-2q1_3+q0_3|<\beta \quad (1)$$

Further, when the filtering process is performed, the deblocking filtering unit 18 applies strong filtering in a case where all of the following Conditional Expressions (2) to (7) are satisfied, and in other cases, applies weak filtering.
[Math 2]

$$2(|p2_0-2p1_0+p0_0|+|q2_0-2q1_0+q0_0|)<\beta/4 \quad (2)$$

$$2(|p2_3-2p1_3+p0_3|+|q2_3-2q1_3+q0_3|)<\beta/4 \quad (3)$$

$$|p3_0-p0_0|+|q0_0-q3_0|\beta/8 \quad (4)$$

$$|p3_3-p0_3|+|q0_3-q3_3|<\beta/8 \quad (5)$$

$$|p0_0-q0_0|<(5t_C+1)/2 \quad (6)$$

$$|p0_3-q0_3|<(5t_C+1)/2 \quad (7)$$

Threshold values $\beta$ and $t_C$ vary depending on an average value $Q_{av}$ of quantization parameters of neighboring blocks P and Q. The deblocking filtering unit 18 includes a reference table presenting a corresponding relation between $Q_{av}$ and the threshold values $\beta$ and $t_C$. An example of the reference table is shown in Table 1. The threshold values $\beta$ and $t_C$ in a case where a bit depth of the image is 8 bits are indicated as threshold values $\beta'$ and $t_C'$, respectively. It should be noted that $Q_{av}$, $\beta'$, and $t_C'$ each can be a value obtained by adding an offset in a frame or slice unit.

TABLE 1

| $Q_{av}$ | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| B' | 0 | 0 | 0 | 0 | 0 | 0 | 0 | 0 | 0 | 0 | 0 | 0 | 0 | 0 | 0 | 0 | 6 | 7 | 8 |
| $t_C'$ | 0 | 0 | 0 | 0 | 0 | 0 | 0 | 0 | 0 | 0 | 0 | 0 | 0 | 0 | 0 | 0 | 0 | 0 | 1 |

| $Q_{av}$ | 19 | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|---|
| B' | 9 | 10 | 11 | 12 | 13 | 14 | 15 | 16 | 17 | 18 | 20 | 22 | 24 | 26 | 28 | 30 | 32 | 34 | 36 |
| $t_C'$ | 1 | 1 | 1 | 1 | 1 | 1 | 1 | 1 | 2 | 2 | 2 | 2 | 3 | 3 | 3 | 3 | 4 | 4 | 4 |

| $Q_{av}$ | 38 | 39 | 40 | 41 | 42 | 43 | 44 | 45 | 46 | 47 | 48 | 49 | 50 | 51 | 52 | 53 | | | |
|---|---|---|---|---|---|---|---|---|---|---|---|---|---|---|---|---|---|---|---|
| B' | 38 | 40 | 42 | 44 | 46 | 48 | 50 | 52 | 54 | 56 | 58 | 60 | 62 | 64 | — | — | | | |
| $t_C'$ | 5 | 5 | 6 | 6 | 7 | 8 | 9 | 10 | 11 | 13 | 14 | 16 | 18 | 20 | 22 | 24 | | | |

When the bit depth is B, the threshold values $\beta$ and $t_C$ are presented by Expressions (8) and (9), respectively. Here, <<1 means an arithmetic left shift operation of one bit.
[Math 3]

$$\beta=\beta'*(1<<(B-8)) \quad (8)$$

$$t_C=t_C'*(1<<(B-8)) \quad (9)$$

In the present disclosure, the deblocking filtering unit 18 sets the threshold values $\beta$ and $t_C$ by shifting the reference table according to a luminance signal level (a pixel value of a luminance component) L to be newly added. A value of the luminance signal level L is, for example, $(p0_0+p0_3+q0_0+q0_3)/4$ or $(p0_0+p0_1+p0_2+p0_3+q0_0+q0_1+q0_2+q0_3)/8$. It should be noted that the method of obtaining the luminance signal level L is only an example, and the present disclosure is not limited thereto.

The deblocking filtering unit 18 acquires a format specifying a dynamic range of a luminance value of the input image. As for a video format, for example, in the H.265/HEVC method, transmission is performed by a higher layer syntax which is called a sequence parameter set, and it is generally possible to identify a type of signal in the decoding device. In the present embodiment, there are three kinds of formats including, for example, SDR, HLG, and PQ. The deblocking filtering unit 18 controls a filtering strength depending on the luminance signal level L, in consideration of the fact that an influence of a difference between luminance signal levels on a display luminance in the HDR method such as the PQ method or the HLG method is larger in comparison to that in the SDR method. In detail, $\beta'$ and $t_C'$ presented in Table 1 are set to $\beta'[Q_{av}]$ and $t_C'[Q_{av}]$ with $Q_{av}$ as an index, and threshold values $\beta'[Q_{av}-a]$ and $t_C'[Q_{av}-b]$ are controlled by shift amounts a and b depending on the luminance signal level L. The shift amounts a and b are determined on the basis of, for example, Expression (10). In Expression (10), an example of the shift amounts a and b in a case of normalizing the luminance signal level L to 0 to 1.0 is presented. In addition, the deblocking filtering unit 18 may determine the shift amounts a and b depending on a requirement of each application, or simply, a may be equal to b (a=b). Further, a=0 or b=0, and only one of the threshold values $\beta'$ and $t_C'$ may be shifted.

In a case of the SDR signal,
if (L < 0.75)
a=0;
else if (L >= 0.75)
a=2;

-continued

In a case of the SDR signal,
if (L < 0.75)
b=0;
else if (L >= 0.75)
b=1;
In a case of the HLG signal,
if (L < 0.5)
a=0;
else if (L >= 0.5 && L < 0.75)
a=2;
else if (L >= 0.75)
a=5;
if (L < 0.5)
b=0;
else if (L >= 0.5 && L < 0.7)
b=3;
else if (L >= 0.7)
b=6;
In a case of the PQ signal,
if (L < 0.3)
a=−1;
else if (L >= 0.3 && L < 0.4)
a=0;
else if (L >= 0.4 && L < 0.5)
a=1;
else if (L >= 0.5 && L < 0.7)

-continued

In a case of the SDR signal, a=5;
else if (L >= 0.7 && L < 0.85)
a=10;
else if (L >= 0.85 && L < 0.95)
a=12;
else if (L >= 0.95)
a=15;
if (L < 0.3)
b=−1;
else if (L >= 0.3 && L < 0.5)
b=0;
else if (L >= 0.5 && L < 0.7)
b=1;
else if (L >= 0.7 && L < 0.95)
b=5;
else if (L >= 0.95)
b=7;

For example, when the shift amounts a=b=5, the deblocking filtering unit 18 shifts the threshold values β' and $t_C$' of the reference table to the left by 5. A result thereof is presented in Table 2. It should be noted that when the shift amount a is a negative value, the threshold values β' and $t_C$' are shifted to the right. When the threshold values β' and $t_C$' are 0 as illustrated in Table 2, the following threshold values also have a lower limit of 0. When the threshold values β' and $t_C$' reach upper limit values of 64 and 24, the following threshold values are complemented by the upper limit value.

TABLE 2

| $Q_{av}$ | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| B' | 0 | 0 | 0 | 0 | 0 | 0 | 0 | 0 | 0 | 0 | 0 | 6 | 7 | 8 | 9 | 10 | 11 | 12 | 13 |
| $t_C$' | 0 | 0 | 0 | 0 | 0 | 0 | 0 | 0 | 0 | 0 | 0 | 0 | 0 | 1 | 1 | 1 | 1 | 1 | 1 |

| $Q_{av}$ | 19 | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|---|
| B' | 14 | 15 | 16 | 17 | 18 | 20 | 22 | 24 | 26 | 28 | 30 | 32 | 34 | 36 | 38 | 40 | 42 | 44 | 46 |
| $t_C$' | 1 | 1 | 1 | 2 | 2 | 2 | 2 | 3 | 3 | 3 | 3 | 4 | 4 | 4 | 5 | 5 | 6 | 6 | 7 |

| $Q_{av}$ | 38 | 39 | 40 | 41 | 42 | 43 | 44 | 45 | 46 | 47 | 48 | 49 | 50 | 51 | 52 | 53 |
|---|---|---|---|---|---|---|---|---|---|---|---|---|---|---|---|---|
| B' | 48 | 50 | 52 | 54 | 56 | 58 | 60 | 62 | 64 | 64 | 64 | 64 | 64 | 64 | — | — |
| $t_C$' | 8 | 9 | 10 | 11 | 13 | 14 | 16 | 18 | 20 | 22 | 24 | 24 | 24 | 24 | 24 | 24 |

The deblocking filtering unit 18 can adaptively control a threshold value of switching of the filtering strength depending on $Q_{av}$ by shifting the threshold values β' and $t_C$' of the reference table according to the shift amount a specified depending on the luminance signal level L. When the threshold values β' and $t_C$' of the reference table are shifted to the right, the threshold values β and $t_C$ are increased, and thus Conditional Expressions (2) to (7) above are easily satisfied and application of strong filtering becomes easy. Accordingly, in the encoding device 1 according to the present disclosure, in a case where the luminance signal level L is high, application of strong filtering in the deblocking filtering unit 18 becomes easy, and as a result, it is possible to reduce an occurrence of a block distortion without deteriorating the compression effect.

As described above, in the encoding device 1, the deblocking filtering unit 18 controls the filtering strength depending on the luminance signal level of the reconstructed image and the quantization parameter. In an embodiment, the deblocking filtering unit 18 retains filtering strength setting information (reference table) indicating a corresponding relation between a first value ($Q_{av}$) calculated on the basis of the quantization parameter, and a second value (β and $t_C$) specifying the filtering strength. The deblocking filtering unit 18 derives the second value by modifying the filtering strength setting information depending on the luminance signal level of the reconstructed image, and applying the first value to the modified filtering strength setting information. The first value is a value determined on the basis of an average value of quantization parameters of two neighboring blocks in the reconstructed image. The second value is a value functioning as a threshold value for switching the filtering strength. The deblocking filtering unit 18 switches the filtering strength by using the second value.

In an embodiment, the deblocking filtering unit 18 controls the filtering strength depending on a format specifying a dynamic range of a luminance value of the input image. The deblocking filtering unit 18 retains filtering strength setting information (reference table) indicating a corresponding relation between a first value ($Q_{av}$) calculated on the basis of the quantization parameter, and a second value (β and $t_C$) specifying the filtering strength, and information (see Expression (10)) for modification which defines a modification method of the filtering strength setting information for each format. The deblocking filtering unit 18 derives the second value by specifying a modification method corresponding to a format applied to the input image on the basis of the information for modification, modifying the filtering strength setting information depending on the luminance signal level of the reconstructed image by using the specified modification method, and applying the first value to the modified filtering strength setting information.

It should be noted that it is possible to suitably use a computer that functions as the encoding device 1 described above, and the computer can be implemented in a manner in which a program, in which contents of a process for realizing each function of the encoding device 1 is described, is stored in a storage unit of the computer, and the program is read and executed by a central processing unit (CPU) of the computer. It should be noted that the program can be recorded in a computer-readable recording medium.

Decoding Device

Figure 4:
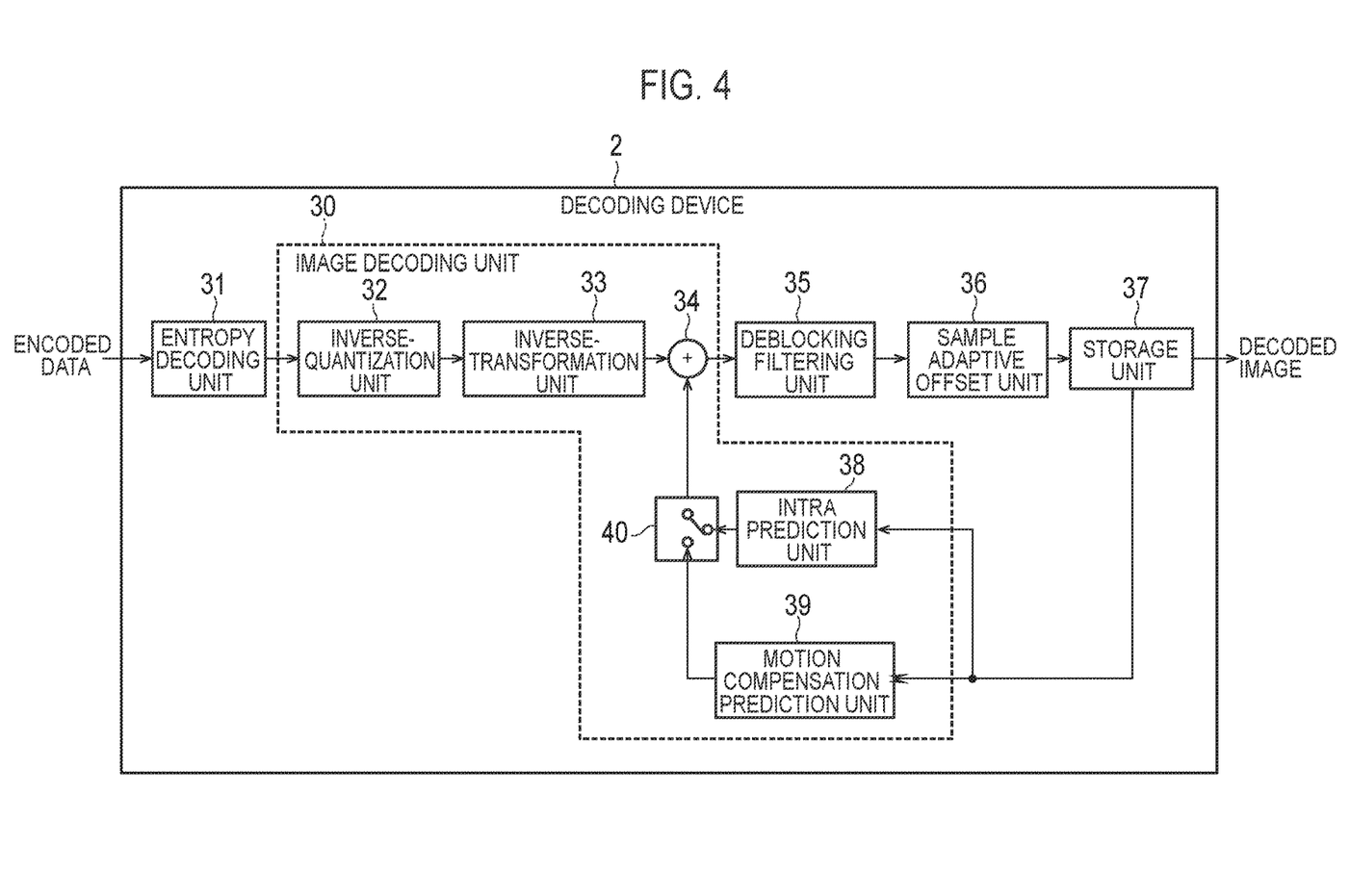
FIG. 4 is a block diagram illustrating an example of a configuration of a decoding device according to an embodiment of the present disclosure.

Next, a decoding device according to an embodiment will be described below. FIG. 4 is a block diagram illustrating an example of a configuration of the decoding device according to an embodiment of the present disclosure. A decoding device 2 illustrated in FIG. 4 includes an entropy decoding unit 31, an inverse-quantization unit 32, an inverse-transformation unit 33, an adding unit 34, a deblocking filtering unit 35, a sample adaptive offset unit 36, a storage unit 37, an intra prediction unit 38, a motion compensation prediction unit 39, and a switching unit 40. The decoding device 2 decodes encoded data of an input image, which are encoded by the encoding device 1.

The entropy decoding unit 31 decodes the encoded data output from the encoding device 1, and acquires a quantization coefficient, an intra prediction mode, motion prediction information, information on filtering, and information on a sample adaptive offset. Then, the entropy decoding unit 31 outputs the quantization coefficient to the inverse-quantization unit 32, outputs the intra prediction mode to the intra prediction unit 38, outputs the motion prediction information to the motion compensation prediction unit 39, outputs the information on filtering to the deblocking filtering unit 35, and outputs the information on the sample adaptive offset to the sample adaptive offset unit 36.

The inverse-quantization unit 32 inputs the quantization coefficient from the entropy decoding unit 31 and a quantization parameter, restores an orthogonal transform coefficient of each block by multiplying the quantization coefficient by a quantization step value derived from the quantization parameter, and outputs the orthogonal transform coefficient to the inverse-transformation unit 33.

The inverse-transformation unit 33 generates a residual image by performing inverse transformation on the orthogonal transform coefficient input from the inverse-quantization unit 32, and outputs the residual image to the adding unit 34.

The adding unit 34 generates a reconstructed image by adding each pixel value of the residual image input from the inverse-transformation unit 33 and each pixel value of the predicted image input from the switching unit 40, and outputs the reconstructed image to the deblocking filtering unit 35.

The deblocking filtering unit 35 performs a filtering process on the reconstructed image input from the adding unit 34, and outputs the reconstructed image after the filtering process to the sample adaptive offset unit 36. The deblocking filtering unit 35 controls a filtering strength depending on a luminance signal level (a pixel value of a luminance component) of the reconstructed image and the quantization parameter.

The sample adaptive offset unit 36 adds an offset to the image input from the deblocking filtering unit 35 according to the information on the sample adaptive offset input from the entropy decoding unit 31, and outputs a result as a decoded image to the storage unit 37.

The storage unit 37 stores an image corresponding to one frame and outputs the stored image to the outside of the decoding device 2.

The intra prediction unit 38 generates an intra prediction image by performing a prediction process according to the intra prediction mode input from the entropy decoding unit 31 with reference to the decoded image stored in the storage unit 37, and outputs the intra prediction image to the switching unit 40.

The motion compensation prediction unit 39 generates a motion compensation prediction image by performing a prediction process according to the information on the motion vector input from the entropy decoding unit 31 with reference to the decoded image stored in the storage unit 37, and outputs the motion compensation prediction image to the switching unit 40.

The switching unit 40 switches between the intra prediction image input from the intra prediction unit 38 and the motion compensation prediction image input from the motion compensation prediction unit 39, and outputs the intra prediction image or the motion compensation prediction image to the adding unit 34.

The image decoding unit 30 is constituted by the inverse-quantization unit 32, the inverse-transformation unit 33, the adding unit 34, the intra prediction unit 38, the motion compensation prediction unit 39, and the switching unit 40. As described above, the image decoding unit 30 generates the reconstructed image by restoring the orthogonal transform coefficient from the quantization coefficient on the basis of the quantization parameter and adding the predicted image of the decoded image to the residual image restored by performing the inverse orthogonal transformation on the orthogonal transform coefficient.

The process performed by the deblocking filtering unit 35 is the same as that performed by the deblocking filtering unit 18. That is, the deblocking filtering unit 35 can adaptively control a threshold value of switching of the filtering strength depending on $Q_{av}$ by shifting the threshold values $\beta'$ and $t_C'$ of the reference table according to the shift amount a specified depending on the luminance signal level L. When the threshold values $\beta'$ and $t_C'$ of the reference table are shifted to the right, the threshold values $\beta$ and $t_C$ are increased, and thus Conditional Expressions (2) to (7) above are easily satisfied and application of strong filtering becomes easy. Accordingly, in the decoding device 2 according to the present disclosure, in a case where the luminance signal level L is high, application of strong filtering in the deblocking filtering unit 35 becomes easy, and as a result, it is possible to reduce an occurrence of a block distortion without deteriorating the compression effect.

As described above, in the decoding device 2, the deblocking filtering unit 35 controls the filtering strength depending on the luminance signal level of the reconstructed image and the quantization parameter. In the embodiment, the deblocking filtering unit 35 retains filtering strength setting information (reference table) indicating a corresponding relation between a first value ($Q_{av}$) calculated on the basis of the quantization parameter, and a second value ($\beta$ and $t_C$) specifying the filtering strength. The deblocking filtering unit 35 derives the second value by modifying the filtering strength setting information depending on the luminance signal level of the reconstructed image, and applying the first value to the modified filtering strength setting information. The first value is a value determined on the basis of an average value of quantization parameters of two neighboring blocks in the reconstructed image. The second value is a value functioning as a threshold value for switching the filtering strength. The deblocking filtering unit 35 switches the filtering strength by using the second value.

In an embodiment, the deblocking filtering unit 35 controls the filtering strength depending on a format specifying a dynamic range of a luminance value of the input image. The deblocking filtering unit 35 retains filtering strength setting information (reference table) indicating a corresponding relation between a first value calculated on the basis of the quantization parameter, and a second value specifying the filtering strength, and information (see Expression (10)) for modification which defines a modification method of the filtering strength setting information for each format. The deblocking filtering unit 35 derives the second value by specifying a modification method corresponding to a format applied to the input image on the basis of the information for modification, modifying the filtering strength setting information depending on the luminance signal level of the reconstructed image by using the specified modification method, and applying the first value to the modified filtering strength setting information.

It should be noted that it is possible to suitably use a computer that functions as the decoding device 2 described above, and the computer can be implemented in a manner in which a program, in which contents of a process for realizing each function of the decoding device 2 is described, is stored in a storage unit of the computer, and the program is read and executed by a central processing unit (CPU) of the computer. It should be noted that the program can be recorded in a computer-readable recording medium.

Although the above embodiments have been described as representative examples, it will be obvious to those skilled in the art that many modifications and substitutions can be made without departing from the spirit and scope of the present disclosure. Therefore, the present disclosure should not be construed as being limited by the above-described embodiments, and various modifications and changes are possible without departing from the scope of the claims. For example, it is possible to combine a plurality of component blocks described in the configuration diagram of the embodiment into one, or to divide one component block.

The invention claimed is:

1. An encoding device comprising:
at least one processor configured to generate a bitstream including:
quantized coefficients obtained by quantizing transform coefficients of a block of an image; and
a sequence parameter set which is a high-level syntax,
wherein the sequence parameter set includes information configured to set one or more thresholds used for a deblocking filter process for the block,
the quantized coefficients are used, by a decoding device, to generate a reconstructed image, and
the sequence parameter set is used, by the decoding device, to
set the one or more thresholds,
identify a luminance signal level range to which a luminance signal level in the reconstructed image belongs, by comparing the luminance signal level with the one or more thresholds, wherein the luminance signal level in the reconstructed image is calculated from pixel values included in two neighboring blocks in the reconstructed image, and
determine a parameter that controls the deblocking filter process by using an adjusting value associated with the identified luminance signal level range.

2. A decoding device comprising:
at least one processor configured to acquire a bitstream including:
quantized coefficients obtained by quantizing transform coefficients of a block of an image; and
a sequence parameter set which is a high-level syntax,
wherein the sequence parameter set includes information configured to set one or more thresholds used for a deblocking filter process for the block,
the quantized coefficients are used, by the decoding device, to generate a reconstructed image, and
the sequence parameter set is used, by the decoding device, to
set the one or more thresholds,
identify a luminance signal level range to which a luminance signal level in the reconstructed image belongs, by comparing the luminance signal level with the one or more thresholds, wherein the luminance signal level in the reconstructed image is calculated from pixel values included in two neighboring blocks in the reconstructed image, and
determine a parameter that controls the deblocking filter process by using an adjusting value associated with the identified luminance signal level range.

3. A non-transitory storage medium that stores a bitstream including:
quantized coefficients obtained by quantizing transform coefficients of a block of an image; and
a sequence parameter set which is a high-level syntax,
wherein the sequence parameter set includes information configured to set one or more thresholds used for a deblocking filter process for the block,
the quantized coefficients are used, by a decoding device, to generate a reconstructed image, and
the sequence parameter set is used, by the decoding device, to
set the one or more thresholds,
identify a luminance signal level range to which a luminance signal level in the reconstructed image belongs, by comparing the luminance signal level with the one or more thresholds, wherein the luminance signal level in the reconstructed image is calculated from pixel values included in two neighboring blocks in the reconstructed image, and
determine a parameter that controls the deblocking filter process by using an adjusting value associated with the identified luminance signal level range.

* * * * *